United States Patent
Ku et al.

(10) Patent No.: US 8,303,782 B2
(45) Date of Patent: Nov. 6, 2012

(54) HYDROGEN GENERATING APPARATUS AND FUEL CELL POWER GENERATION SYSTEM

(75) Inventors: Bo-Sung Ku, Suwon-si (KR); Jae-Hyuk Jang, Seoul (KR); Kyoung-Soo Chae, Suwon-si (KR); Jae-Hyoung Gil, Seoul (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 800 days.

(21) Appl. No.: 12/421,192

(22) Filed: Apr. 9, 2009

(65) Prior Publication Data
US 2010/0009224 A1    Jan. 14, 2010

(30) Foreign Application Priority Data
Jul. 8, 2008    (KR) .................. 10-2008-0065948

(51) Int. Cl.
*C25B 9/18*    (2006.01)
(52) U.S. Cl. .................. 204/263; 204/248; 205/637
(58) Field of Classification Search .................. 204/248, 204/263; 205/637
See application file for complete search history.

(56) References Cited

U.S. PATENT DOCUMENTS

| | | | |
|---|---|---|---|
| 2001/0050234 A1* | 12/2001 | Shiepe | 205/629 |
| 2004/0007476 A1* | 1/2004 | Tennakoon et al. | 205/343 |
| 2005/0183962 A1* | 8/2005 | Oakes | 205/340 |
| 2007/0092769 A1* | 4/2007 | Davis et al. | 429/21 |
| 2007/0205111 A1* | 9/2007 | Bayliss | 205/637 |

* cited by examiner

*Primary Examiner* — Nicholas A. Smith
(74) *Attorney, Agent, or Firm* — McDermott Will & Emery LLP

(57) ABSTRACT

A hydrogen generating apparatus is disclosed. The hydrogen generating apparatus in accordance with an embodiment of the present invention includes: a first hydrogen generating unit, which has a first electrode generating hydrogen by decomposing an electrolyte aqueous solution; a second hydrogen generating unit, which has a second electrode that is placed adjacent to the first hydrogen generating unit and surface thereof is formed with a super absorbent polymer that is gelled when water is absorbed; a solution separation membrane interposed between the first hydrogen generating unit and the second hydrogen generating unit; a reactor accommodating the first hydrogen generating unit, the second hydrogen generating unit and the solution separation membrane; and a hydrogen vent being formed on one side of the reactor, which is adjacent to the second hydrogen generating unit.

14 Claims, 5 Drawing Sheets

HYDROGEN GENERATING APPARATUS AND FUEL CELL POWER GENERATION SYSTEM

CROSS-REFERENCE TO RELATED APPLICATIONS

This application claims the benefit of Korean Patent Application No. 10-2008-0065948, filed with the Korean Intellectual Property Office on Jul. 8, 2008, the disclosure of which is incorporated herein by reference in its entirety.

BACKGROUND

1. Technical Field

The present invention relates to a hydrogen generating apparatus and a fuel cell power generation system.

2. Description of the Related Art

A fuel cell is an apparatus that converts the chemical energy of fuel (hydrogen, LNG, LPG, methanol, etc.) and air directly into electricity and heat, by means of electrochemical reactions. In contrast to conventional power generation technologies, which employ the processes of burning fuel, generating vapor, driving turbines, and driving power generators, the utilization of a fuel cell, which does not entail a combustion process or driving apparatus, is a new technology for generating power that offers high efficiency and few environmental problems.

Examples of fuel cells being researched for application to portable electronic devices include the polymer electrolyte membrane fuel cell (PEMFC), which uses hydrogen as the fuel, and the direct liquid fuel cell, such as the direct methanol fuel cell (DMFC), which uses liquid fuel directly. The PEMFC provides a high output density but requires a separate apparatus for supplying hydrogen.

Methods used in generating hydrogen for the polymer electrolyte membrane fuel cell (PEMFC) can mainly include utilizing the oxidation of aluminum, utilizing the hydrolysis of metal borohydrides, and utilizing reactions on metal electrodes, among which the rate of hydrogen generation is efficiently regulated using metal electrodes. In this method, the electrons obtained when magnesium in the electrode is ionized to $Mg^{2+}$ ions are moved through a wire and connected to another metal object, generating hydrogen by the dissociation of water. The amount of hydrogen generated can be regulated, as it is related to the distance between the electrodes and the size of the electrodes.

However, to generate power from the fuel cell, in which water is the main fuel source, it is imperative that pure hydrogen be provided only. In other words, penetration of moisture may cause degradation and malfunction of the fuel cell. This is an urgent problem to be resolved, especially for application to portable electronic devices.

SUMMARY

An aspect of the invention provides a hydrogen generating apparatus mixing a liquid type hydrogen generating unit and a gel type hydrogen generating unit and a fuel cell power generation system.

Another aspect of the invention provides a hydrogen generating apparatus. The hydrogen generating apparatus can include: a first hydrogen generating unit comprising a first electrode, the first electrode generating hydrogen by decomposing an electrolyte aqueous solution; a second hydrogen generating unit comprising a second electrode, the second electrode being placed adjacent to the first hydrogen generating unit, a super absorbent polymer formed on a surface of the second electrode, the super absorbent polymer being gelled when water is absorbed; a solution separation membrane interposed between the first hydrogen generating unit and the second hydrogen generating unit; a reactor accommodating the first hydrogen generating unit, the second hydrogen generating unit and the solution separation membrane; and a hydrogen vent being formed on one side of the reactor, the side of the reactor being adjacent to the second hydrogen generating unit.

The hydrogen generating apparatus can further include: the second hydrogen generating unit placed is formed on both sides of the first hydrogen generating unit; and the hydrogen vent is formed on both sides of the reactor, each of the both sides of the reactor being adjacent to the second hydrogen generating unit.

The hydrogen generating apparatus can further include: a filter interposed between the second hydrogen generating unit and the hydrogen vent, in which the first electrode is electrically connected to the second electrode; a control unit, regulating an amount of hydrogen generation by electrically being connected to the first electrode or the second electrode.

Yet, another aspect of the invention provides a fuel cell power generation system. The fuel cell power generation system can include: a hydrogen generating apparatus; and a fuel cell, producing electrical energy by converting chemical energy of hydrogen generated from the hydrogen generating apparatus, in which the hydrogen generating apparatus further include; a first hydrogen generating unit comprising a first electrode, the first electrode generating hydrogen by decomposing an electrolyte aqueous solution; a second hydrogen generating unit comprising a second electrode, the second electrode being placed adjacent to the first hydrogen generating unit, a super absorbent polymer formed on a surface of the second electrode, the super absorbent polymer being gelled when water is absorbed; a solution separation membrane interposed between the first hydrogen generating unit and the second hydrogen generating unit; a reactor accommodating the first hydrogen generating unit, the second hydrogen generating unit and the solution separation membrane; and a hydrogen vent being formed on one side of the reactor, the side of the reactor being adjacent to the second hydrogen generating unit.

The fuel cell power generation system can further include: the second hydrogen generating unit is placed on both sides of the first hydrogen generating unit; the hydrogen vent is formed on both sides of the reactor, each of the both sides of the reactor being adjacent to the second hydrogen generating unit. The solution separation membrane can include a hydrophobic substance.

The fuel cell power generation system can include: a filter interposed between the second hydrogen generating unit and the hydrogen vent, in which the filter has an opening, the opening being smaller than a particle of the super absorbent polymer; in which the first electrode is electrically connected to the second electrode; and a control unit, regulating an amount of hydrogen generation by electrically being connected to the first electrode or the second electrode.

Additional aspects and advantages of the present invention will be set forth in part in the description which follows, and in part will be obvious from the description, or may be learned by practice of the invention.

DETAILED DESCRIPTION

Figure 1:
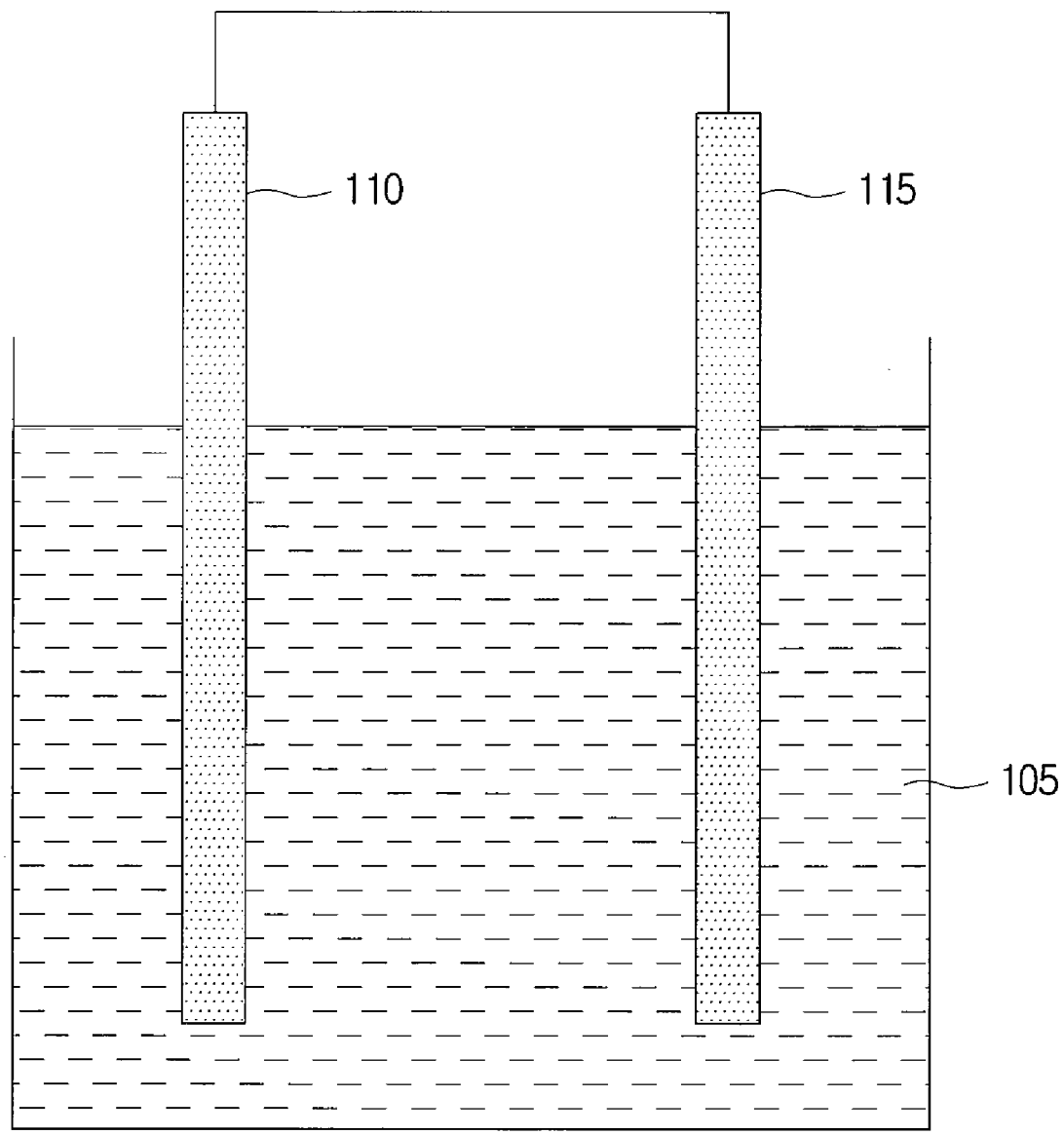
FIG. 1 illustrates a principle of how hydrogen is generated by a hydrogen generating apparatus according to an aspect of the present invention.

As the invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In the description of the present invention, certain detailed explanations of related art are omitted when it is deemed that they may unnecessarily obscure the essence of the invention.

While such terms as "first" and "second," etc., may be used to describe various components, such components must not be limited to the above terms. The above terms are used only to distinguish one component from another. For example, a first component may be referred to as a second component without departing from the scope of rights of the present invention, and likewise a second component may be referred to as a first component. The term "and/or" encompasses both combinations of the plurality of related items disclosed and any item from among the plurality of related items disclosed.

The terms used in the present specification are merely used to describe particular embodiments, and are not intended to limit the present invention. An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Certain embodiments of a hydrogen generating apparatus and a fuel cell power generation system according to the invention will be described below in more detail with reference to the accompanying drawings. Those components that are the same or are in correspondence are rendered the same reference numeral regardless of the figure number, and redundant explanations are omitted.

FIG. 1 illustrates a principle of how hydrogen is generated in a hydrogen generating apparatus according to an aspect of the present invention and shows an electrolyte aqueous solution 105, an anode 110 and a cathode 115. Before describing an embodiment of the hydrogen generating apparatus according to an aspect of the present invention, a reaction of the anode 110 and the cathode 115 will be described by referring to FIG. 1.

The anode 110 is an active electrode and can generate electrons in the electrolyte aqueous solution 105. The anode 110 can be made of, for instance, magnesium (Mg). Because of the difference of ionization tendency between the anode 110 and hydrogen, the anode 110 can be oxidized as a cation while the anode releases the electrons in the electrolyte aqueous solution 105.

The electrons, released in the reaction, move to the cathode 115, which is electrically connected to the anode 110, and the anode 110 becomes smaller as the anode releases the electrons.

The cathode 115 is an inert electrode and can be thinner than the anode 110 because the cathode, unlike the anode 110, is not expendable. The cathode 115 is placed in the electrolyte aqueous solution 105 and can generate hydrogen from the electrolyte aqueous solution 105 by receiving electrons released from the anode 110. The cathode 115 can be made of, for instance, stainless steel and can generate hydrogen by reacting with electrons. That is, in the chemical reaction at the cathode 115, the electrolyte aqueous solution 105 is decomposed to hydrogen by receiving electrons that moved from the anode 110. The reactions at each electrode, when the anode 110 is a magnesium electrode, are as follows:

[Reaction Scheme 1]
Anode 110: $Mg \rightarrow Mg^{2+} + 2e^-$
Cathode 115: $2H_2O + 2e^- \rightarrow H_2 + 2(OH)^-$
Overall Reaction: $Mg + 2H_2O \rightarrow Mg(OH)_2 + H_2$ $LiCl$, $KCl$, $NaCl$, $KNO_3$, $NaNO_3$, $CaCl_2$, $MgCl_2$, $K_2SO_4$, $Na_2SO_4$, $MgSO_4$, and $AgCl$ or a combination thereof can be used as an electrolyte of the electrolyte aqueous solution 105, and the electrolyte aqueous solution 105 can include hydrogen ions.

Figure 2:
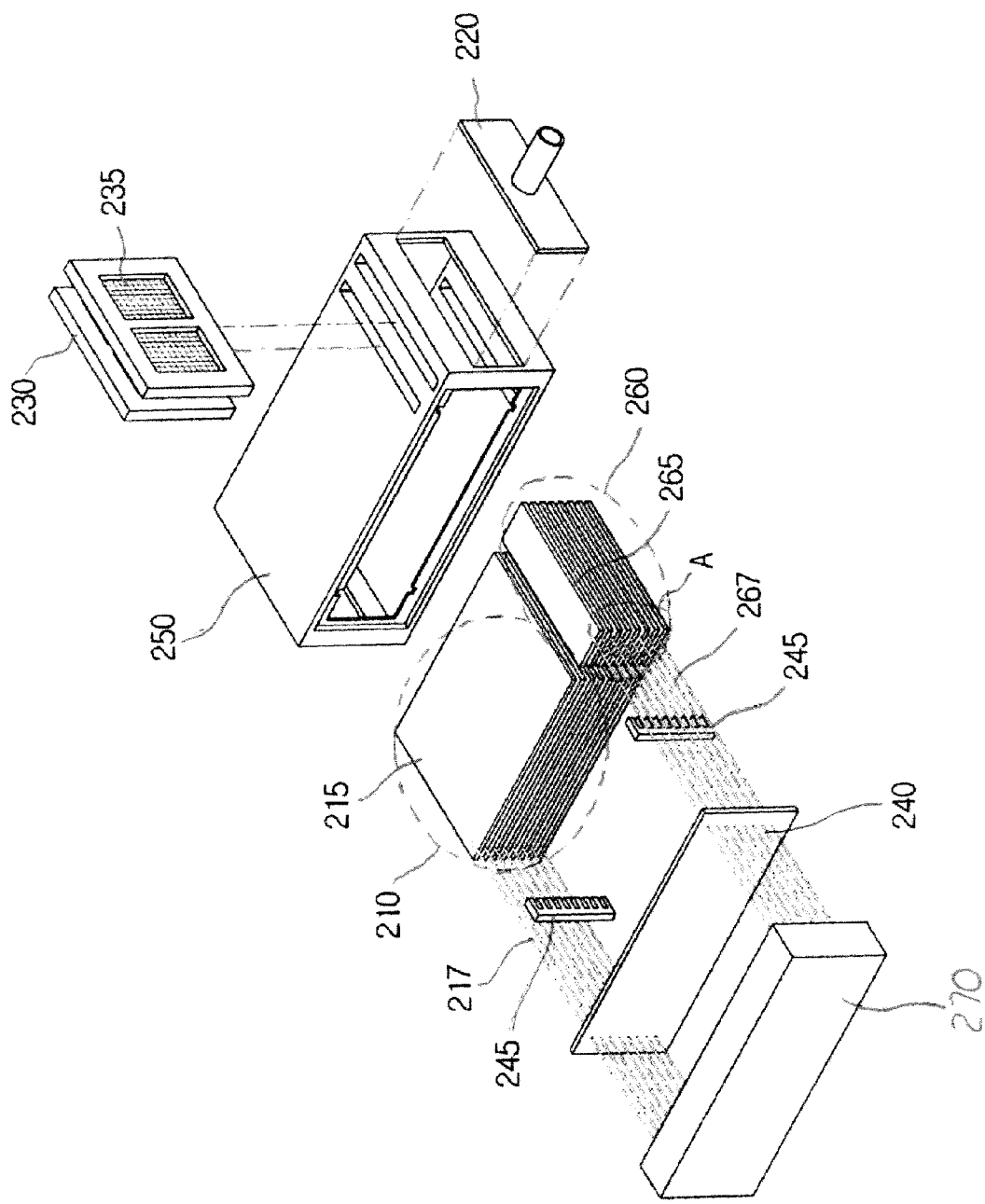
FIG. 2 is an exploded perspective view of an embodiment of a hydrogen generating apparatus according to an aspect of the present invention.
Figure 3:
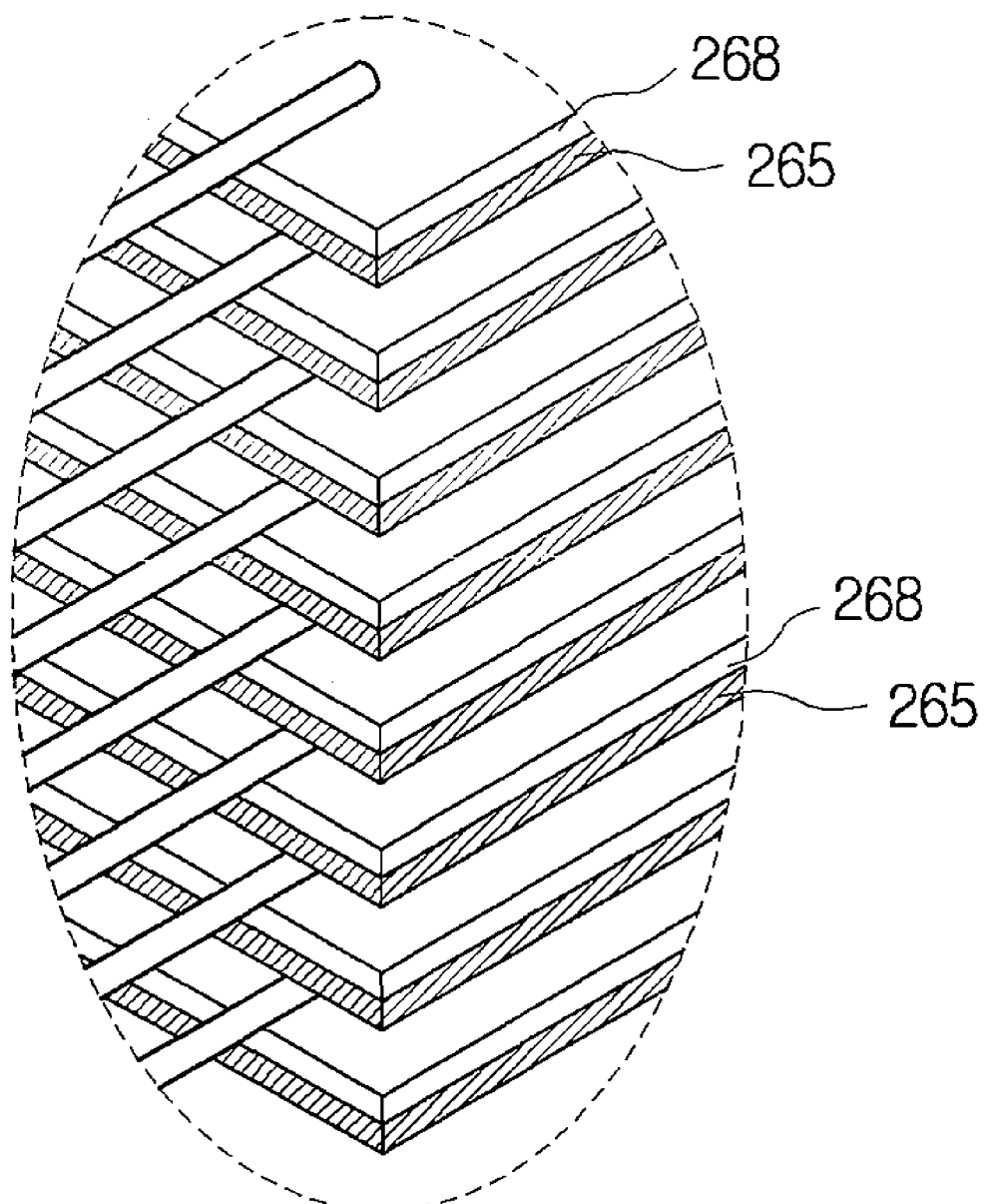
FIG. 3 is a magnified view of an embodiment of a second hydrogen generating unit according to an aspect of the present invention.

FIG. 2 is an exploded perspective view illustrating an embodiment of the hydrogen generating apparatus according to an aspect of the present invention and shows a first hydrogen generating unit 210, a first electrode 215, wires 217 and 267, a hydrogen vent 220, a solution separation membrane 230, filters 235, a reactor cover 240, a reactor 250, a second hydrogen generating unit 260, a second electrode 265 and a control unit 270.

The reactor 250, having the hydrogen vent 220 on one side, accommodates the first hydrogen generating unit 210 and the second hydrogen generating unit 260 and supplies hydrogen, released from the first hydrogen generating unit 210 and the second hydrogen generating unit 260, to a fuel cell through the hydrogen vent 220.

The first hydrogen generating unit 210 includes the first electrode 215, which generates hydrogen through electrolysis of the electrolyte aqueous solution. An anode and a cathode form a pair to constitute the first electrode 215, which consists of one or more pairs of metal plates. Hydrogen is generated by the reactions described in the above Reaction Scheme 1.

As the first hydrogen generating unit 210 includes an electrolyte aqueous solution, moisture may be escaped along with generated hydrogen. If moisture escapes from the reactor, the hydrogen generating apparatus may become less efficient, with a decreased yield of hydrogen, and use of an apparatus in which the hydrogen generating apparatus is applied, especially the potable electronic device, may be inconvenient. Therefore, to prevent moisture from escaping from the reactor, it is required that moisture be absorbed and used again for generating hydrogen.

Moisture can be primarily prevented from escaping from the reactor 250 by mounting the solution separation membrane 230 on the path through which hydrogen is discharged.

The solution separation membrane 230 is a film-type of equipment with an opening, the size of which is appropriate for allowing gas to pass through and liquid to be blocked. In this embodiment, the solution separation membrane 230 allows hydrogen to pass through and blocks the electrolyte aqueous solution. For example, the solution separation membrane 230 having an opening of bigger than 5 micrometers and smaller than 10 micrometers can supply dry hydrogen because the electrolyte aqueous solution can not pass through it. Including a hydrophobic substance in the solution separation membrane 230 can be more effective in preventing moisture from passing through the opening.

However, the solution separation membrane 230 may not completely prevent moisture from passing through or escaping. The second hydrogen generating unit 260, which is placed near the first hydrogen generating unit 210, can therefore eliminate hydrogen secondarily, differentiating the present embodiment from a conventional hydrogen generating apparatus. The second hydrogen generating unit 260 includes a second electrode 265, in which a super absorbent polymer 268 is formed on the surface thereof.

The super absorbent polymer 268 can be defined as a polymer that absorbs a fluid by importing a hydrophilic group in a single chain structure or a three-dimensional net structure that cross-links a chain of polymers. The super absorbent polymer remains in a state of white power in an ordinary dried condition but changes to gel, by instantly absorbing moisture and expanding, when introduced to water, The super absorbent polymer, such as Polyacryl amide, Polyacryl acid, Polymethacrylic acid, Polyethylene oxide, Polyvinyl alcohol, Gelatin, Polysaccharides, Sodium carboxyl methyl cellulose and Chitosan., can absorb 100 times to 400 times of water by weight.

The electrolyte aqueous solution of the first hydrogen generating unit 210 that is passed through the solution separation membrane 230 is absorbed is gelled by the super absorbent polymer 268 formed on the surface of the second electrode 265, and thus the electrolyte aqueous solution can be prevented from escaping through the hydrogen vent 220. The moisture, absorbed by the super absorbent polymer 268, can be decomposed by the second electrode to generate hydrogen, although slower than in the state of electrolyte solution.

While the first hydrogen generating unit 210 and the second hydrogen generating unit 260 provides a sufficient hydrogen generation speed, and the super absorbent polymer 268 included in the super absorbent polymer 268 prevents the leakage of water, the hydrogen generating apparatus of the present embodiment can generate hydrogen efficiently by using the electrolyte and moisture absorbed in the super absorbent polymer 268.

In addition, a filter 235 can be interposed between the second hydrogen generating unit 260 and the hydrogen vent 220 so that the gelled super absorbent polymer 268 is prevented from escaping through the hydrogen vent. For the filter 235, a silk net or a SUS (Steel Use Stainless) net, with a smaller opening than the particles of the gelled super absorbent polymer 268, can be used.

Moreover, as illustrated in FIG. 2, in case one side of the reactor 250 is open, the reactor 250 can also have a reactor cover 240 to seal the opening. The reactor cover 240 can have an electrode holding unit 245, in which the electrodes can be fixed.

Each electrode can be electrically connected to the control unit 270 through the wires 217 and 267. The control unit 270 can provide a path, through which electrons move between the anode and the cathode, and can regulate the amount of hydrogen generation by controlling the flow of electrons.

Figure 4:
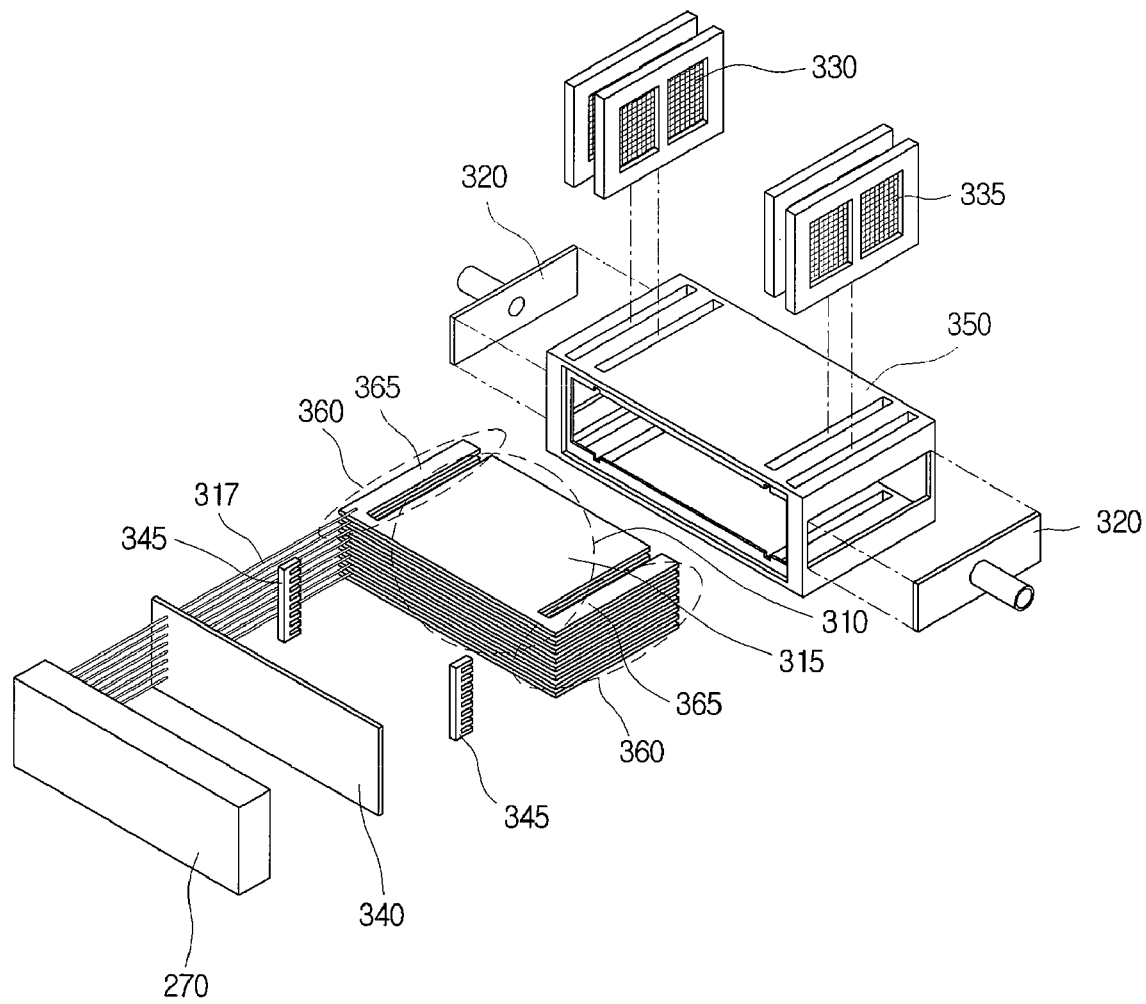
FIG. 4 is an exploded perspective view of another embodiment of a hydrogen generating apparatus according to an aspect of the present invention.

FIG. 4 is an exploded perspective view illustrating another embodiment of the hydrogen generating apparatus according to an aspect of the present invention. Illustrated in FIG. 4 are a first hydrogen generating unit 310, a first electrode 315, wires 317, a hydrogen vent 320, a solution separation membrane 330, filters 335, a reactor cover 340, a reactor 350, a second hydrogen generating unit 360, a second electrode 365 and a control unit 370.

Unlike the embodiment shown in FIG. 2, the present embodiment has the second hydrogen generating unit 360 and the second hydrogen vent 320 formed on both sides of the first hydrogen generating unit 310. If the hydrogen vent 320 is only placed on one side of the first hydrogen generating unit 310, it may difficult to discharge hydrogen through the vent if the vent faces downward, as potable electronic devices can be frequently flipped up and down. As shown in FIG. 4, however, if the second hydrogen vent 320 is formed on both sides of the first hydrogen generating unit 310, hydrogen may be discharged easily through the hydrogen vent 320, regardless of a direction the vent faces.

The number of the second hydrogen generating unit 360 can be increased in accordance with the number of the hydrogen vent 320. As the embodiment described above, the first hydrogen generating unit 310 and the second hydrogen generating unit 360 have the same components and functions to those of the first hydrogen generating unit 210 and the second hydrogen generating unit 260 of FIG. 2, so that the pertinent description will be omitted.

As shown in FIG. 4, if the first electrode 315 and the second electrode 365 constitute one metal plate, the wires 317 can control both the first electrode 315 and the second electrode 365 together without forming the wires 317 on the first electrode 315 and the second electrode 365 separately.

The hydrogen generating apparatus of the present embodiment can also have the control unit 370, the solution separation membrane 330 and the filter 335, which have similar functions and shapes as those of the control unit 270, the solution separation membrane 230 and the filter 235 of FIG. 2 so that the pertinent description will be omitted.

Figure 5:
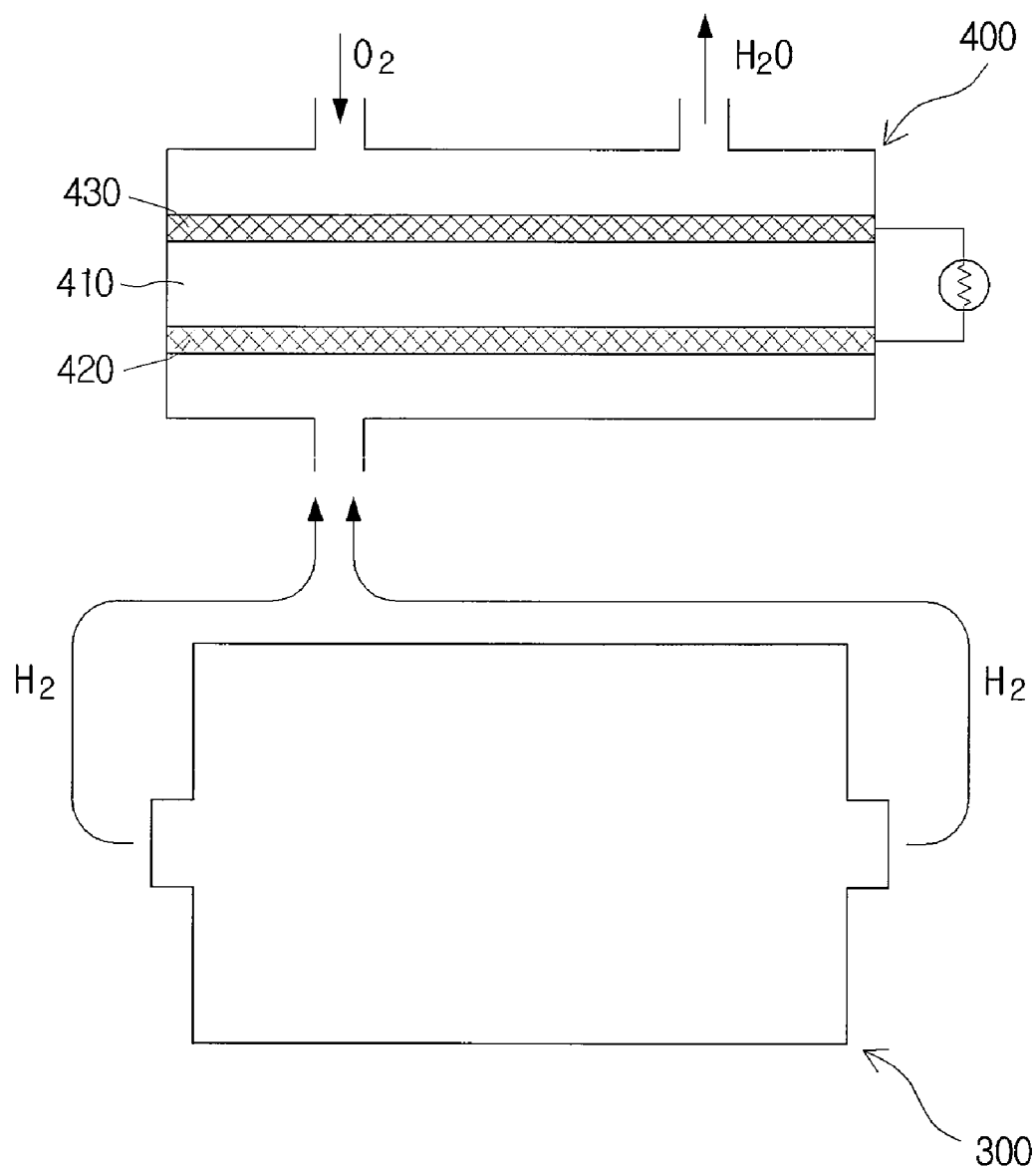
FIG. 5 is a diagram illustrating an embodiment of a fuel cell power generation system according to another aspect of the present invention.

FIG. 5 illustrates an embodiment of a fuel cell power generation system according to another aspect of the present invention. FIG. 5 shows a fuel cell 400, an electrolyte membrane 410, a fuel polar 420, an air polar 430 and a hydrogen generating apparatus 300.

The present embodiment provides an efficient fuel cell power generation system 400 because dry hydrogen can be supplied by the hydrogen generating apparatus and a larger quantity of hydrogen can be generated from the same electrolyte aqueous solution. The construction and operation of the hydrogen generating apparatus 300 are the same as or corresponding to the earlier-described embodiment, and thus the pertinent description will be omitted. Hereinafter, the fuel cell 400, which is the difference from the earlier-described embodiment, will be described.

The fuel cell 400 can produce electrical energy by converting chemical energy of hydrogen generated by the hydrogen generating apparatus 300. The low humidity hydrogen, generated by the hydrogen generating apparatus 300, can be moved to the fuel polar 420 of the fuel cell 400 and thus can make an oxidation reaction to generate hydrogen ions and electrons. The air polar 430 makes a reduction reaction to generate electrical energy, by receiving electrodes from the fuel polar and hydrogen ions from the electrolyte membrane.

That is, electrical energy can be generated directly from chemical energy of hydrogen by such oxidation-reduction reaction. Reactions at the fuel polar 420 and the air polar 430 are as follows:

[Reaction Scheme 2]

Fuel polar: $H_2 \rightarrow 2H^+ + 2e^-$ Air polar: $O_2 + 4H^+ + 4e^- \rightarrow 2H_2O$ Overall Reaction: $2H_2 + O_2 \rightarrow 2H_2O$ In one possible embodiment of the present invention, a liquid type of hydrogen generating unit and a gel type of hydrogen generating unit can be separated so as to prevent the discharge of moisture without sacrificing the speed of hydrogen generation and raise the yield of hydrogen by increasing the use of moisture.

While the invention has been described in detail with reference to particular embodiments, the embodiments are for illustrative purposes only and do not limit the invention. It is to be appreciated that those skilled in the art can change or modify the embodiments without departing from the scope and spirit of the invention. As such, many embodiments other than those set forth above can be found in the appended claims.

What is claimed is:

1. A hydrogen generating apparatus comprising:
   a first hydrogen generating unit comprising a first electrode, the first electrode generating hydrogen by decomposing an electrolyte aqueous solution;
   a second hydrogen generating unit comprising a second electrode, the second electrode being placed adjacent to the first hydrogen generating unit, a super absorbent polymer formed on a surface of the second electrode, the super absorbent polymer being gelled when water is absorbed;
   a solution separation membrane interposed between the first hydrogen generating unit and the second hydrogen generating unit;
   a reactor accommodating the first hydrogen generating unit, the second hydrogen generating unit and the solution separation membrane; and
   a hydrogen vent being formed on one side of the reactor, the side of the reactor being adjacent to the second hydrogen generating unit,
   wherein the solution separation membrane allows the hydrogen to pass through and the electrolyte aqueous solution to be blocked such that the electrolyte aqueous solution is primarily prevented from escaping from the reactor,
   the super absorbent polymer is gelled by absorbing a portion of the electrolyte aqueous solution which is not blocked by the solution separation membrane and passes from the first hydrogen generating unit to the second hydrogen generating unit through the solution separation membrane such that the electrolyte aqueous solution is secondarily prevented from escaping from the reactor, and
   the second hydrogen generating unit generates the hydrogen by decomposing the portion of the electrolyte aqueous solution absorbed by the super absorbent polymer.

2. The hydrogen generating apparatus of claim 1, wherein:
   the second hydrogen generating unit placed is formed on both sides of the first hydrogen generating unit; and
   the hydrogen vent is formed on both sides of the reactor, each of the both sides of the reactor being adjacent to the second hydrogen generating unit.

3. The hydrogen generating apparatus of claim 1, wherein the solution separation membrane comprises a hydrophobic substance.

4. The hydrogen generating apparatus of claim 1, further comprising a filter interposed between the second hydrogen generating unit and the hydrogen vent.

5. The hydrogen generating apparatus of claim 4, wherein the filter has an opening, the opening being smaller than a particle of the super absorbent polymer.

6. The hydrogen generating apparatus of claim 1, wherein the first electrode is electrically connected to the second electrode.

7. The hydrogen generating apparatus of claim 1, further comprising a control unit, regulating an amount of hydrogen generation by electrically being connected to the first electrode or the second electrode.

8. A fuel cell power generation system, comprising:
   a hydrogen generating apparatus; and
   a fuel cell, producing electrical energy by converting chemical energy of hydrogen generated from the hydrogen generating apparatus,
   wherein the hydrogen generating apparatus comprises:
   a first hydrogen generating unit comprising a first electrode, the first electrode generating hydrogen by decomposing an electrolyte aqueous solution;
   a second hydrogen generating unit comprising a second electrode, the second electrode being placed adjacent to the first hydrogen generating unit, a super absorbent polymer formed on a surface of the second electrode, the super absorbent polymer being gelled when water is absorbed;
   a solution separation membrane interposed between the first hydrogen generating unit and the second hydrogen generating unit;
   a reactor accommodating the first hydrogen generating unit, the second hydrogen generating unit and the solution separation membrane; and
   a hydrogen vent being formed on one side of the reactor, the side of the reactor being adjacent to the second hydrogen generating unit,
   wherein the solution separation membrane allows the hydrogen to pass through and the electrolyte aqueous solution to be blocked such that the electrolyte aqueous solution is primarily prevented from escaping from the reactor,
   the super absorbent polymer is gelled by absorbing a portion of the electrolyte aqueous solution which is not blocked by the solution separation membrane and passes from the first hydrogen generating unit to the second hydrogen generating unit through the solution separation membrane such that the electrolyte aqueous solution is secondarily prevented from escaping from the reactor, and
   the second hydrogen generating unit generating hydrogen by decomposing the electrolyte aqueous solution absorbed by the super absorbent polymer.

9. The fuel cell power generation system of claim 8, wherein:
   the second hydrogen generating unit is placed on both sides of the first hydrogen generating unit; and
   the hydrogen vent is formed on both sides of the reactor, each of the both sides of the reactor being adjacent to the second hydrogen generating unit.

10. The fuel cell power generation system of claim 8, wherein the solution separation membrane comprises a hydrophobic substance.

11. The fuel cell power generation system of claim 8, further comprising a filter interposed between the second hydrogen generating unit and the hydrogen vent.

12. The fuel cell power generation system of claim 11, wherein the filter has an opening, the opening being smaller than a particle of the super absorbent polymer.

13. The fuel cell power generation system of claim 8, wherein the first electrode is electrically connected to the second electrode.

14. The fuel cell power generation system of claim 8, further comprising a control unit, regulating an amount of hydrogen generation by electrically being connected to the first electrode or the second electrode.

* * * * *